(12) United States Patent
Szor

(10) Patent No.: US 7,155,742 B1
(45) Date of Patent: Dec. 26, 2006

(54) COUNTERING INFECTIONS TO COMMUNICATIONS MODULES

(75) Inventor: Peter Szor, Santa Monica, CA (US)

(73) Assignee: Symantec Corporation, Cupertino, CA (US)

( * ) Notice: Subject to any disclaimer, the term of this patent is extended or adjusted under 35 U.S.C. 154(b) by 978 days.

(21) Appl. No.: 10/151,598

(22) Filed: May 16, 2002

(51) Int. Cl.
 *H04L 9/00* (2006.01)

(52) U.S. Cl. .................. 726/25; 709/223; 709/246; 709/203; 713/2; 713/164; 713/165; 713/167; 726/22; 726/23; 726/24

(58) Field of Classification Search .................. None
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,473,769 A | 12/1995 | Cozza | |
| 5,572,590 A | 11/1996 | Chess | |
| 5,598,531 A * | 1/1997 | Hill | 726/24 |
| 5,696,822 A | 12/1997 | Nachenberg | |
| 5,715,174 A * | 2/1998 | Cotichini et al. | 709/229 |
| 5,715,464 A * | 2/1998 | Crump et al. | 713/323 |
| 5,758,359 A | 5/1998 | Saxon | |
| 5,802,178 A * | 9/1998 | Holden et al. | 713/151 |
| 5,812,763 A | 9/1998 | Teng | |
| 5,889,943 A | 3/1999 | Ji et al. | |
| 5,951,698 A | 9/1999 | Chen et al. | |
| 5,956,481 A | 9/1999 | Walsh et al. | |
| 5,960,170 A | 9/1999 | Chen et al. | |
| 5,978,917 A | 11/1999 | Chi | |
| 5,987,610 A | 11/1999 | Franczek et al. | |
| 6,052,709 A | 4/2000 | Paul et al. | |
| 6,070,244 A | 5/2000 | Orchier et al. | |
| 6,072,830 A | 6/2000 | Proctor et al. | |
| 6,088,803 A | 7/2000 | Tso et al. | |
| 6,094,731 A | 7/2000 | Waldin et al. | |
| 6,104,872 A | 8/2000 | Kubota et al. | |
| 6,108,799 A | 8/2000 | Boulay et al. | |
| 6,167,434 A | 12/2000 | Pang | |
| 6,192,379 B1 | 2/2001 | Bekenn | |
| 6,199,181 B1 * | 3/2001 | Rechef et al. | 714/38 |

(Continued)

FOREIGN PATENT DOCUMENTS

DE  100 21 686 A1  11/2001

(Continued)

OTHER PUBLICATIONS

Vasudevan, A., et al, 'SPiKE: Engineering Malware Analysis Tools using Unobtrusive Binary-Instrumentation', Australian Computer Society, 2006, Dept of CS & Engineering, Univ of Texas at Arlington, entire document, http://crpit.com/confpapers/CRPITV48Vasudevan.pdf.*

(Continued)

*Primary Examiner*—Nasser Moazzami
*Assistant Examiner*—Ronald Baum
(74) *Attorney, Agent, or Firm*—Fenwick & West LLP

(57) ABSTRACT

Methods, apparati and computer readable media for countering malicious code infections that spread from a first computer to a second computer. A searching module (51) searches for a communications module (20) within the first computer (1(1)). An examining module (52) examines a function location directory (27) within the communications module (20). A locating module (53) locates a send function within the function location directory (27). A declaring module (54) declares the presence of malicious code when the function location directory (27) states that the send function is slated to start executing at a non-normal location.

23 Claims, 5 Drawing Sheets

U.S. PATENT DOCUMENTS

| | | |
|---|---|---|
| 6,275,938 B1 | 8/2001 | Bond et al. |
| 6,338,141 B1 | 1/2002 | Wells |
| 6,357,008 B1 | 3/2002 | Nachenberg |
| 6,370,648 B1 | 4/2002 | Diep |
| 6,493,007 B1 | 12/2002 | Pang |
| 6,535,891 B1 | 3/2003 | Fisher et al. |
| 6,552,814 B1 | 4/2003 | Okimoto et al. |
| 6,611,925 B1 | 8/2003 | Spears |
| 6,622,150 B1 | 9/2003 | Kouznetsov et al. |
| 6,678,734 B1 * | 1/2004 | Haatainen et al. .......... 709/230 |
| 6,697,950 B1 | 2/2004 | Ko |
| 6,721,721 B1 | 4/2004 | Bates et al. |
| 6,748,534 B1 | 6/2004 | Gryaznov et al. |
| 6,763,462 B1 | 7/2004 | Marsh |
| 6,813,712 B1 | 11/2004 | Luke |
| 6,851,057 B1 | 2/2005 | Nachenberg |
| 6,910,134 B1 | 6/2005 | Maher et al. |
| 2002/0004908 A1 | 1/2002 | Galea |
| 2002/0035696 A1 | 3/2002 | Thacker |
| 2002/0046275 A1 | 4/2002 | Crosbie et al. |
| 2002/0083175 A1 | 6/2002 | Afek et al. |
| 2002/0091940 A1 | 7/2002 | Wellborn et al. |
| 2002/0157008 A1 | 10/2002 | Radatti |
| 2002/0162015 A1 | 10/2002 | Tang |
| 2002/0178374 A1 | 11/2002 | Swimmer et al. |
| 2003/0023865 A1 | 1/2003 | Cowie et al. |
| 2003/0051026 A1 | 3/2003 | Carter et al. |
| 2003/0065926 A1 * | 4/2003 | Schultz et al. .............. 713/188 |
| 2003/0115485 A1 | 6/2003 | Milliken |
| 2003/0120951 A1 | 6/2003 | Gartside et al. |
| 2003/0126449 A1 | 7/2003 | Kelly et al. |
| 2003/0140049 A1 | 7/2003 | Radatti |
| 2003/0191966 A1 | 10/2003 | Gleichauf |
| 2003/0212902 A1 | 11/2003 | van der Made |
| 2003/0236995 A1 | 12/2003 | Fretwell, Jr. |
| 2004/0015712 A1 | 1/2004 | Szor |
| 2004/0015726 A1 | 1/2004 | Szor |
| 2004/0030913 A1 | 2/2004 | Liang et al. |
| 2004/0158730 A1 | 8/2004 | Sarkar |
| 2004/0162808 A1 | 8/2004 | Margolus et al. |
| 2004/0181687 A1 | 9/2004 | Nachenberg et al. |
| 2005/0021740 A1 | 1/2005 | Bar et al. |
| 2005/0044406 A1 | 2/2005 | Stute |
| 2005/0132205 A1 | 6/2005 | Palliyil et al. |
| 2005/0177736 A1 | 8/2005 | De los Santos et al. |
| 2005/0204150 A1 | 9/2005 | Peikari |
| 2006/0064755 A1 | 3/2006 | Azadet et al. |

FOREIGN PATENT DOCUMENTS

| | | |
|---|---|---|
| EP | 1 280 039 A | 1/2003 |
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

News Release—Symantec Delivers Cutting-Edge Anti-Virus Technology with Striker32, Oct. 1, 1999, 2 pages, [online]. Retrieved on Nov. 11, 2003. Retrieved from the Internet:<URL:http://www.symantec.com/press/1999/n991001.html>. Author unknown.

Von Babo, Michael, "Zehn Mythen um Computerviren: Dichtung and Wahrheit über den Schrecken des Informatikzeitalters," Technische Rundschau, Hallwag, Bern, Switzerland, vol. 84, No. 36. Sep. 4, 1992, pp. 44-47.

Delio, M., "Virus Throttle a Hopeful Defense", Wired News, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Symantec Corporation "Norton AntiVirus Corporation Edition 7.0" Manual, 1999, Version 1, 44 pages.

Peter Szor, "Attacks on Win32", *Virus Bulletin Conference Proceedings*, Oct. 1988, pp. 57-84, Virus Bulletin Ltd, The Pentagon, Abingdon, Oxfordshire, England.

Peter Szor, "Attacks on Win32—Part II", *Virus Bulletin Conference Proceedings*, Sep. 2000, pp. 47-68, Virus Bulletin Ltd, The Pentagon, Abingdon, Oxfordshire, England.

* cited by examiner

FIG.3

| FUNCTION # | FUNCTION NAME | # OF SECTION | ADDRESS (OFFSET) |
|---|---|---|---|
| ⋮ | ⋮ | ⋮ | ⋮ |
| 18 | RECEIVE | 25 | BD3E |
| 19 | SEND | 25 | B0F7 |
| 20 | BIND | 22 | 13F8 |
| 21 | CONNECT | 22 | 23F5 |
| ⋮ | ⋮ | ⋮ | ⋮ |

↖ 27

COUNTERING INFECTIONS TO COMMUNICATIONS MODULES

TECHNICAL FIELD

This invention pertains to the field of countering infections to computer systems caused by malicious code such as computer worms.

BACKGROUND ART

As used herein, "malicious code" is any computer program, module, or piece of code that enters a computer system without the authorized user's knowledge and/or without the authorized user's consent. The term "malicious code" includes viruses, Trojan horse programs, and worms. The malicious code may or may not have the ability to replicate itself.

This invention has particular applicability to malicious code that has the ability to replicate itself from one computer to another, e.g., over a computer network. The computer network may be a closed proprietary network or an open network such as the Internet. Such malicious code is often referred to as a "worm". Szor, Peter, "Attacks on Win32", *Virus Bulletin Conference*, October 1998, England, and Szor, Peter, "Attacks on Win32—Part II", Virus Bulletin Conference, September 2000, England, describe various attacks by malicious code, including worms, on computer systems, with particular applicability to the Win32 API (Application Programming Interface).

DISCLOSURE OF INVENTION

The present invention comprises methods, apparati, and computer readable media for countering malicious code infections that spread from a first computer to a second computer. A preferred embodiment of the inventive method comprises the steps of:

searching (43) for a communications module (20) within a first computer (1(1));

examining (45) a function location directory (27) within the communications module (20);

locating (46) a send function within the function location directory (27); and declaring the presence of malicious code when the function location directory (27) states that the send function is slated to start executing at a non-normal location.

BRIEF DESCRIPTION OF THE DRAWINGS

These and other more detailed and specific objects and features of the present invention are more fully disclosed in the following specification, reference being had to the accompany drawings, in which:

FIG. 3 is an illustration of a function location directory 27 upon which the present invention operates.

DETAILED DESCRIPTION OF THE PREFERRED EMBODIMENTS

Figure 1:
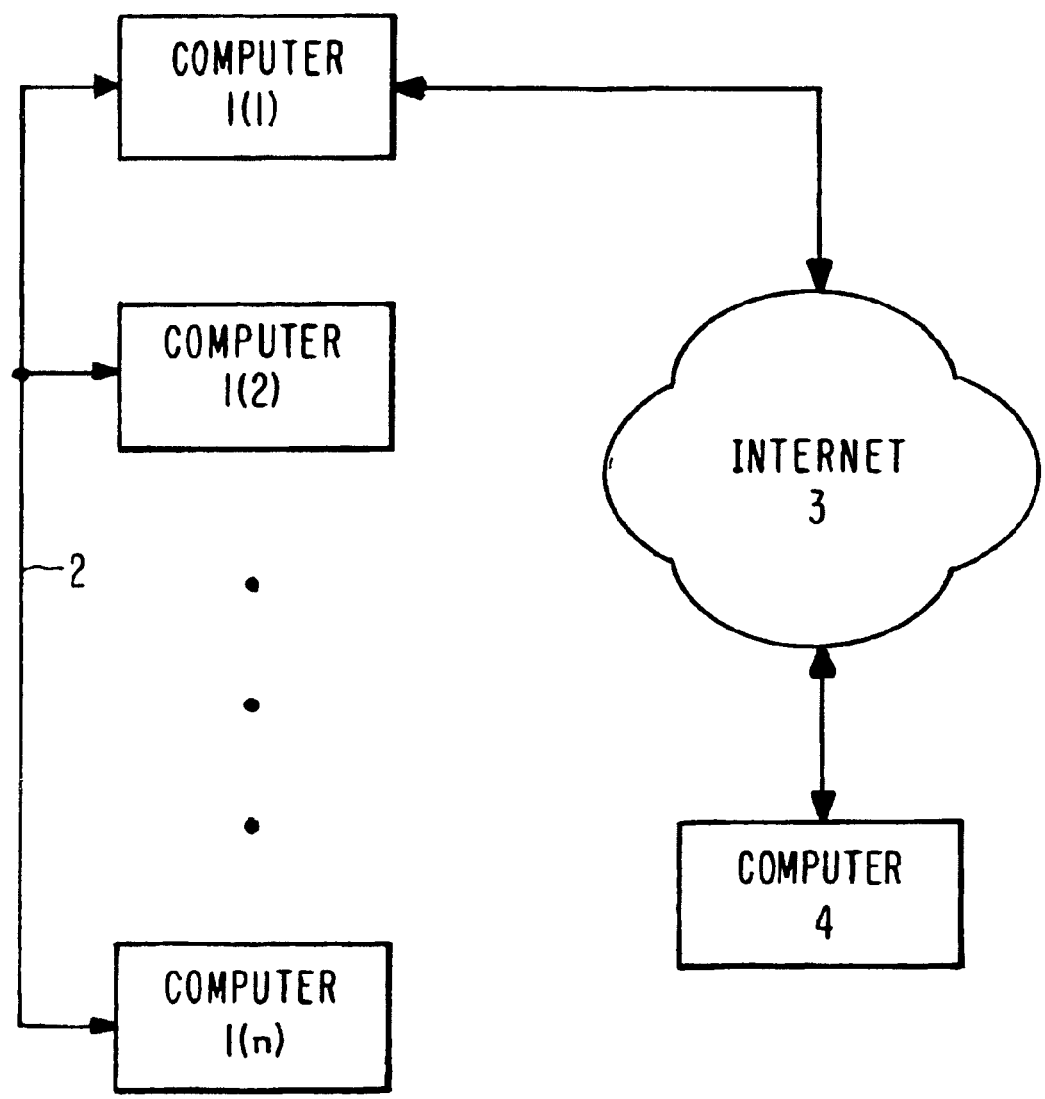
FIG. 1 is an illustration of a computer network in which the present invention has applicability.

FIG. 1 illustrates an environment in which the present invention has applicability. A plurality of computers 1 are interconnected in a closed proprietary network 2. FIG. 1 illustrates n interconnected computers, where n is an arbitrary positive integer. Computer 1(1) is also coupled via an open network such as the Internet 3 to another computer 4. It is assumed that malicious code attacks computer 1(1), with the ability to replicate itself and thus attack another computer 1 via network 2, or attack computer 4 via network 3. Such malicious code is often referred to as a "worm".

Figure 2:
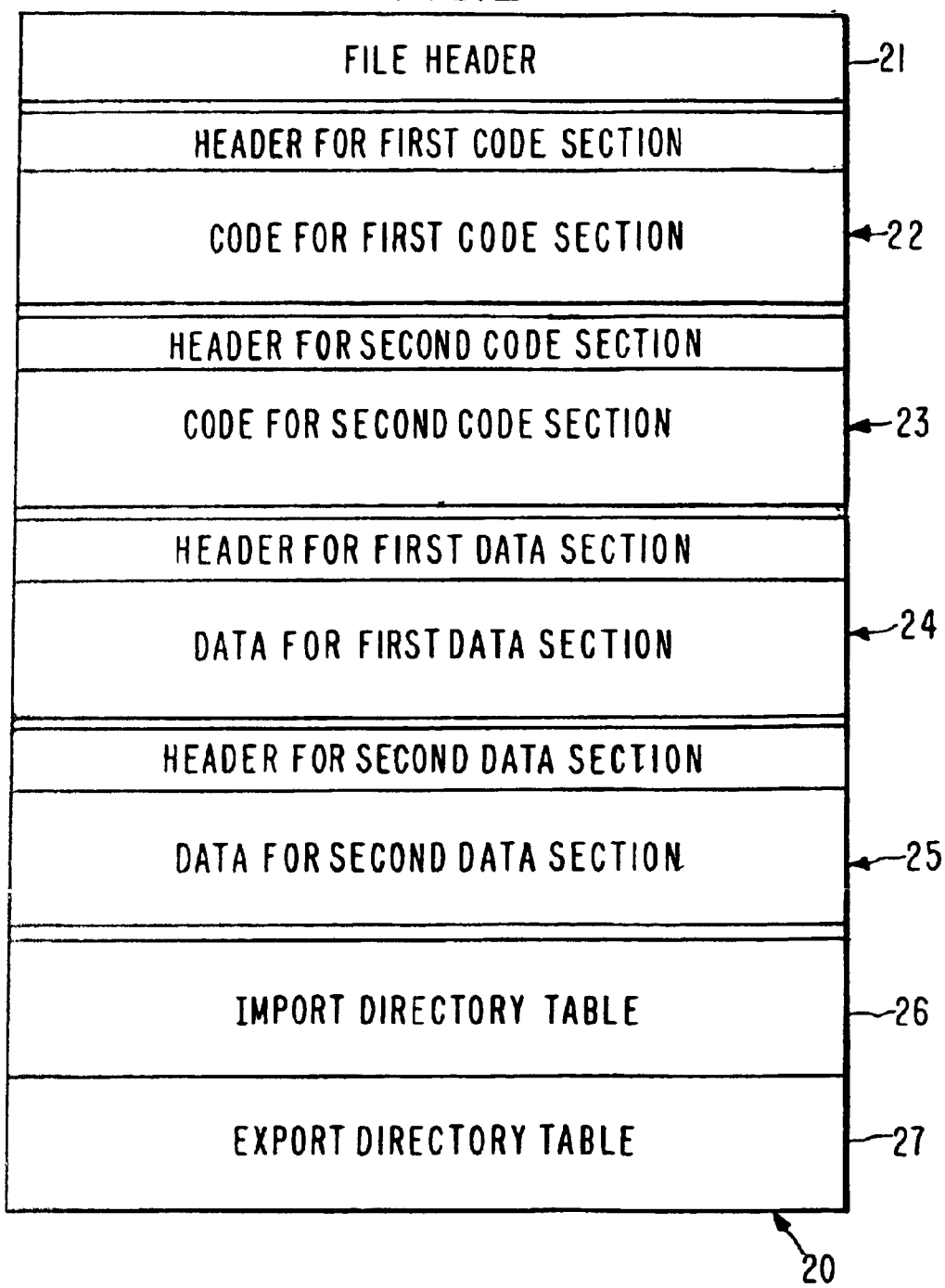
FIG. 2 is an illustration of a PE (Portable Executable) file format 20 for which the present invention has particular applicability.

FIG. 2 illustrates a communications module 20 by which the malicious code may replicate itself. As used herein, "communications module" means any discrete piece of code within computer 1(1) that can assist computer 1(1) to send or receive information to or from another computer 1,4. For purposes of illustration only, module 20 is shown as being in the PE (Portable Executable) format, a standard format for files used in the Win32 API (Application Programming Interface). Win32 is used in 32 bit operating systems manufactured by Microsoft Corporation.

Module 20 may be a DLL (Dynamic Link Library) such as WSOCK32.DLL. "SOCK" stands for "socket" as in SSL (Secure Socket Layer), i.e., an Internet Protocol interface used for communications. WSOCK32.DLL is independent of any particular communications card. A DLL contains a plurality of items that are used in common by several applications. The purpose of such a DLL is to save memory space within computer 1. One DLL may contain one or more APIs (functions) or partial APIs. A DLL can contain executable files and data files, usually in PE format.

The method of operation for spreading the malicious code may be that the malicious code attaches a "hook" (extraneous code) onto at least one API in the WSOCK32.DLL of the host computer 1(1). The hook may cause the recipient computer 1,4 to get an extraneous message in an e-mail received from the host computer 1(1). The user of the recipient computer 1,4 then clicks on the extraneous message, which causes the recipient computer's WSOCK32.DLL 20 to become infected in the same manner as the host computer 1(1) became infected.

A file header 21 is present within file 20. File header 21 contains a listing of each section within file 20 and its location within file 20, usually expressed as an offset from the beginning of file 20. File 20 normally contains one or more code sections 22,23, one or more data sections 24,25, an import directory table 26, and an export directory table 27.

Each section 22–27 within file 20 contains a header, which gives, among other information, the size of useful information contained within that section. This enables the identification of slack regions within the section. A slack region is a region that does not contain useful information. For example, a slack region may contain all zeroes, all ones, or a combination of zeroes and ones devoid of meaning and signifying nothing. The reason that slack regions exist is that a section normally comprises a discrete number of sectors having fixed length, e.g., 512 bytes, and only by sheer coincidence would the size of the useful information be an exact multiple of 512 bytes.

In the communications module 20 illustrated in FIG. 2, there are two code sections 22, 23 and two data sections 24, 25. In a given communications module 20, there can be an arbitrary number of code sections and an arbitrary number of data sections.

Export control directory 27 is a special case of a "function location directory". A function location directory is a section within module 20 that lists functions (and the locations of these functions) used by module 20 in linking with other files, such as executable programs. The file to which module 20 is linked will have a matching import directory table. Similarly, import directory table 26 is used for linking with an external file, and matches to a corresponding export directory table within that file.

FIG. 3 illustrates the contents of a typical export directory table 27, in this case, one having four columns. The first column contains an arbitrary function number, the second column contains the name of the function, the third column contains the number of the section where the function is located, and the fourth column contains the address within file 20 where the function is located, i.e., the entry point address for that particular function. This address is normally expressed as an offset from the beginning address of the specified file 20.

FIG. 3 shows these offsets being represented in hexadecimal notation. FIG. 3 illustrates four common functions: RECEIVE, SEND, BIND, and CONNECT. In the illustrated example, BIND and CONNECT are stated to begin within the first code section 22; and RECEIVE and SEND are stated to begin within the second data section 25. Since RECEIVE and SEND are stated to begin in a section 25 other than a code section, a presumption is created that RECEIVE and SEND contain malicious code.

Figure 4:
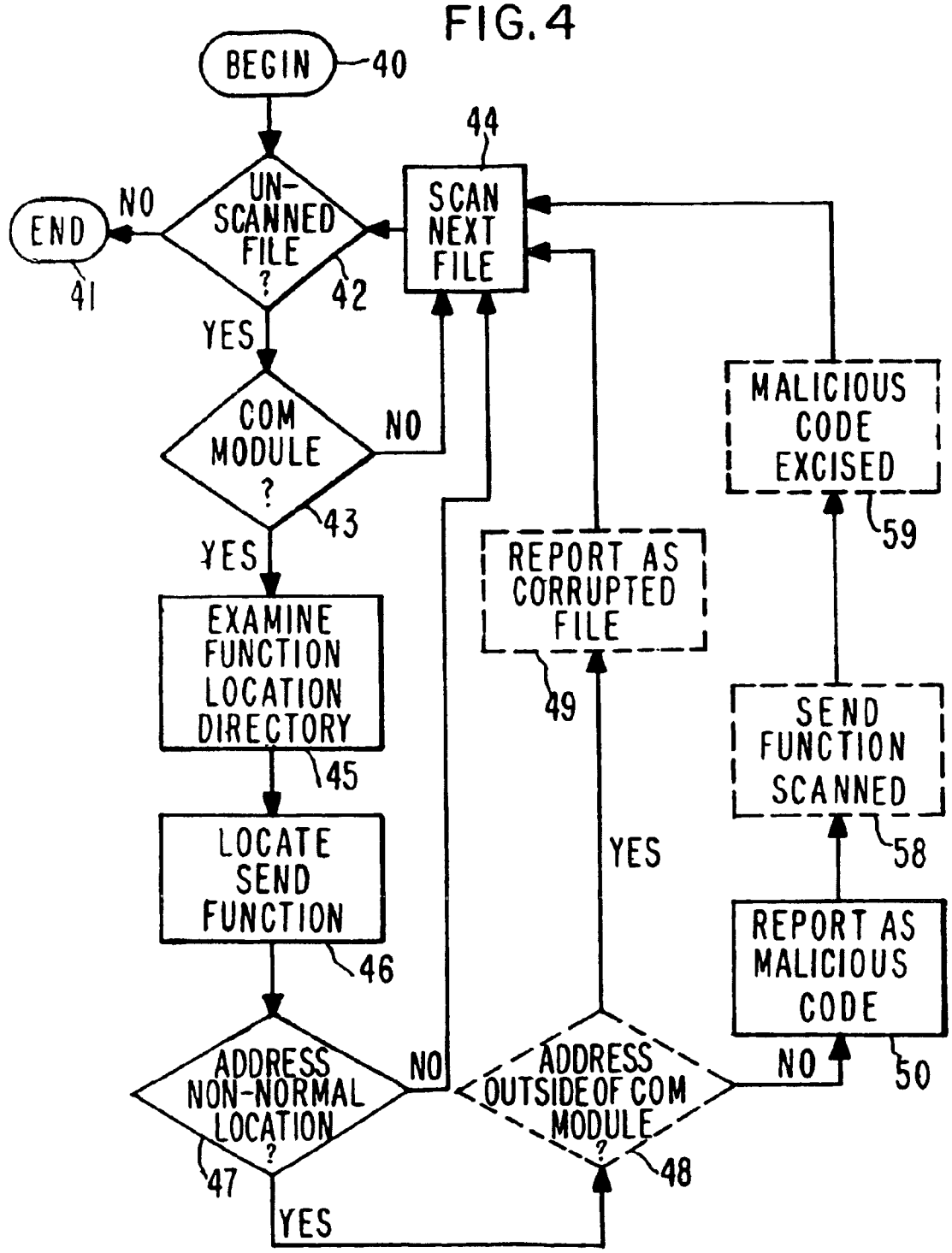
FIG. 4 is a flow diagram illustrating a preferred embodiment of the present invention.

FIG. 4 illustrates a preferred embodiment of the present inventive method. The method steps illustrated in FIG. 4 can be implemented by means of the modules illustrated in FIG. 5. The modules 51–56 illustrated in FIG. 5 can be implemented in hardware, software, and/or firmware. These modules 51–56 may reside on a computer-readable medium 60 such as a hard disk, floppy disk, CD, DVD, etc.

The method begins at step 40 with searching module 51 searching through all or a preselected subset of the files of computer 1, seriatim. At step 42, searching module 51 asks whether there are any such files that are yet to be searched. If there are not any such files, the method ends at step 41. If there are such files, i.e., searching module 51 has a current file to operate on, module 51, at step 43, asks whether the file being operated on contains a communications module 20. This determination is preferably made by module 51 first determining whether there is a function location directory (such as export directory table 27) within the module 20, and, if so, by looking for specific names (such as WSOCK32.DLL) of known communication modules 20 in the header of the function location directory 27. In an alternative embodiment, searching module 51 looks for specific names (such as WSOCK32.DLL) of known communications modules 20 in the header of the file 20. The reason that it is preferred to look in the header of the function location directory 27 rather than in the header of the file 20 is that it is more common for nefarious persons to deceitfully change the header of the file 20 than to deceitfully change the header of the directory 27.

If the file being operated upon does not contain a communications module 20, the method proceeds to step 44, where searching module 51 searches the next file within computer 1, and then to step 42.

If the file being operated upon contains a communications module 20, control passes to examining module 52. At step 45, examining module 52 examines the function location directory (e.g., export directory table 27) within the communications module 20. Control then passes to locating module 53, which, at step 46, locates the send function that is normally present within any communications module 20. In a Win32 API, the send function is located by name, i.e., export directory table 27 contains the word "SEND". In other operating system environments, the send function may be identified by other means, e.g., a hexadecimal identifier. "Send function" is used in this specification (including claims) in a general sense, and is meant to encompass similar functions that are not labeled "SEND" as such, e.g., functions that may be labeled "EXPORT", "ATTACH", "BIND", "MAIL", etc.

Control then passes to declaring module 54, which, at step 47, inquires as to whether the address for the send function, as specified in directory 27, is a non-normal address, i.e., directory 27 gives as a starting address for the function a location that is not the normal starting location for that function. As used herein, a "non-normal location" can be one of three things:

1) An address within a slack region of a code section 22,23 within the communications module 20.

2) An address within a section (e.g., 24, 25, 26, 27) of the communications module that is not a code section 22,23.

3) An address completely outside the communications module 20.

In alternative embodiments, only one or two, rather than three, of the above criteria are used in deciding whether a certain starting address is a "non-normal" location.

If declaring module 54 determines at step 47 that the starting address for the send function is a normal location, i.e., one not satisfying the above definition of a non-normal location, control is passed to step 44, i.e., the communications module 20 being operated upon is deemed to not contain malicious code. If, on the other hand, declaring module 54 determines that the starting address of the send function is a non-normal location, control is passed to step 50, or, in an embodiment where optional steps 48 and 49 are present, to optional step 48. At step 48, declaring module 54 inquires as to whether the address of the send function is completely outside the confines of communications module 20. This corresponds to criterion 3 within the above definition of "non-normal location". If the answer is no, it is known that either criterion 1 or criterion 2 of the above definition has been satisfied, and, at step 50, module 54 makes a determination that module 20 has been attacked by malicious code. This determination may be flagged to the operator of computer 1(1).

Control then passes to optional scanning module 55, which may be an anti-malicious code scan engine. At optional step 58, module 55 scans the code comprising the send function to confirm that malicious code is present therein. This confirmation can be achieved by any one of a number of techniques, or by a combination of techniques. For example, if a certain section of code is found by scanning module 55 to coincide with a characteristic signature of known malicious code, the declaration of malicious code made in step 50 is confirmed. If, on the other hand, evidence is found indicating or suggesting that malicious code is not after all present in the send function, the declaration of malicious code made in step 50 is deemed to be erroneous and is rescinded in step 58. Such evidence might comprise one or both of the following items:

1) The send function, while starting at a non-normal location, starts with a jump instruction jumping control to a normal start location for a send function. This is evidence of repaired code, rather than malicious code.

2) The send function contains a large number of zeroes and/or NOPs (no operations). Again, this is evidence of repaired code, rather than malicious code.

Control then passes to excising module 56, which, at optional step 59, excises the malicious code from within the send function, if the declaration of malicious code hasn't been rescinded in step 58. As used herein, "excise" is used in a broad sense, and encompasses any repair of the send function such that the malicious code is no longer able to harm computer 1(1). The method then proceeds to step 44. It should be noted that step 59 may be present even if step 58 is not present. With respect to FIG. 5, excising module 56 may be present even when scanning module 55 is not present. In such a case, excising module 56 is coupled to declaring module 54 directly, rather than through scanning module 55.

If the answer to the question in step 48 is "yes", i.e., criterion 3 has been satisfied, two different things may happen. In a first embodiment, declaring module 54 at step 49 reports the file containing communications module 20 as being corrupted rather than as being infected with malicious code, on the theory that it is so unusual for the starting address of the send function to be completely outside module 20 that a typical virus writer would not do this. The method then proceeds to step 44. In a second embodiment (not illustrated), declaring module 54, at step 49, reports the module 20 as containing malicious code, as in step 50. As a sub-embodiment to the second embodiment, steps 48 and 49 are not present at all, i.e., no distinction is made as to whether the "non-normal location" satisfies criterion 1, 2, or 3.

Figure 5:
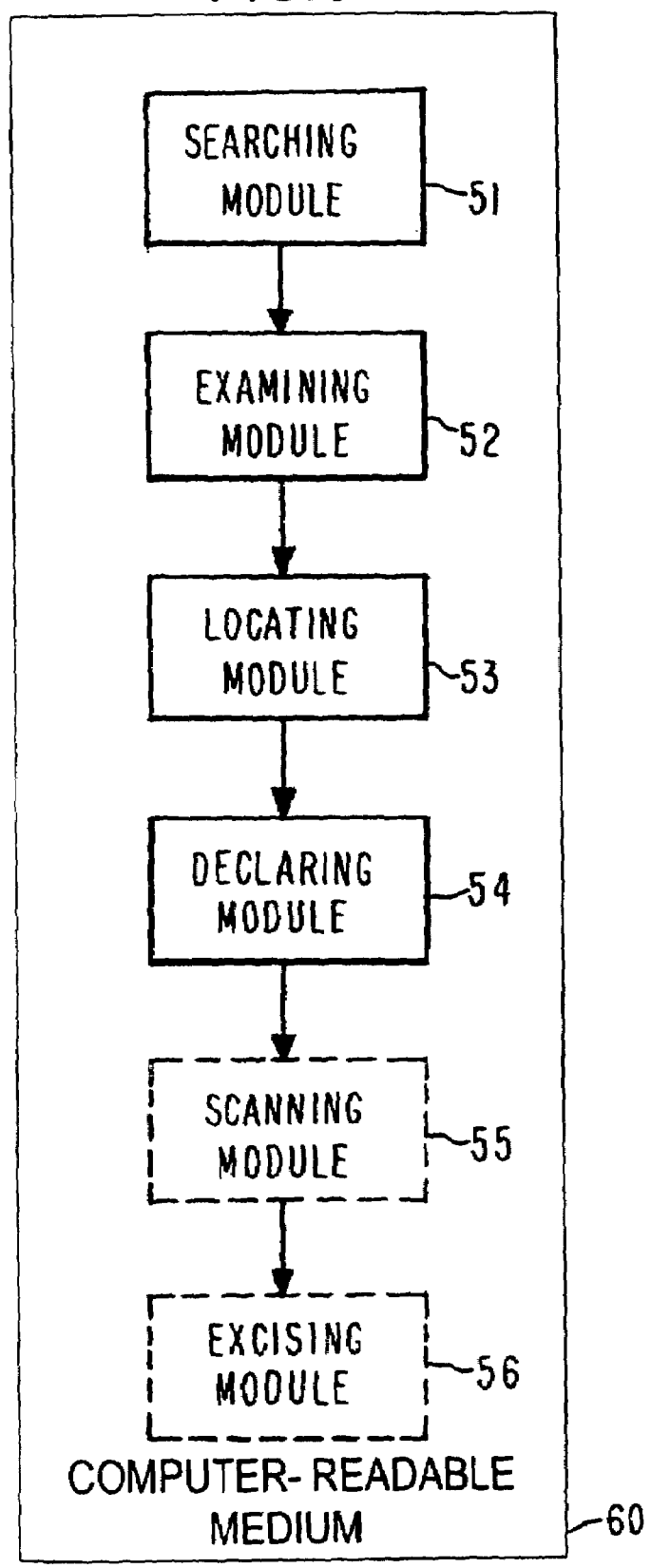
FIG. 5 is a block diagram illustrating software, firmware, and/or hardware modules 51–56 used in a preferred embodiment of the present invention.

FIG. 5 illustrates a computer-readable medium 60 containing the inventive modules 51–56. Searching module 51 is coupled to examining module 52, which is coupled to locating module 53. which is coupled to declaring module 54, which is coupled to optional scanning module 55, which is coupled to optional excising module 56.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention. For example, instead of basing the declaration of malicious code upon the condition that the starting address of a send function is a non-normal location, the basis for declaring malicious code could be that another function, e.g., a receive function, a bind function, or a connect function, is stated to have, within function location directory 27, a starting address that is non-normal.

What is claimed is:

1. A computer implemented method for countering malicious code infections that spread from a first computer to second computer, said method comprising the steps of:
    searching for a communications module within the first computer;
    examining a function location directory within the communications module;
    locating a send function within the function location directory;
    declaring the presence of malicious code when the function location directory states that the send function is slated to start executing at a non-normal location; and
    excising malicious code detected within the send function.

2. The method of claim 1 wherein the non-normal location is within a slack region of a code section within the communications module.

3. The method of claim 1 wherein the non-normal location is within a section of the communications module other than a code section.

4. The method of claim 1 wherein the non-normal location is outside the communications module.

5. The method of claim 1 wherein the communications module is a dynamic link library.

6. The method of claim 1 wherein the function location directory is an export directory table.

7. The method of claim 1 wherein the communications module is in the PE (Portable Executable) format.

8. The method of claim 1 further comprising the step of scanning the send function to confirm the presence of malicious code.

9. The method of claim 8 wherein the declaration of malicious code is confirmed when the scanning step identifies a signature of known malicious code within the send function.

10. The method of claim 8 wherein the declaration of malicious code is rescinded when the scanning step uncovers evidence suggesting that malicious code is not present within the send function.

11. The method of claim 10 wherein the evidence comprises the existence of a jump instruction at a beginning portion of the send function.

12. The method of claim 10 wherein the evidence comprises a large number of items from the group of items comprising zeroes within the send function and non-operations within the send function.

13. A computer implemented method for detecting corrupted code within a computer, said method comprising the steps of:
    searching for a communications module within the computer;
    examining a function location directory within the communications module;
    locating a send function within the function location directory;
    declaring the presence of corrupted code when the function location directory states that the send function is slated to start executing at a location outside the communications module; and
    excising malicious code detected within the send function.

14. Apparatus for countering malicious code infections that spread from a first computer to a second computer, said apparatus comprising:
    a module for searching for a communications module within the first computer;
    coupled to the searching module, a module for examining a function location directory within the communications module;
    coupled to the examining module, a module for locating a send function within the function location directory;
    coupled to the locating module, a module for declaring the presence of malicious code when the function location directory states that the send function is slated to start executing at non-normal location; and
    coupled to the declaring module, a module for excising malicious code detected within the send function.

15. The apparatus of claim 14 further comprising:
    coupled to the declaring module, a module for scanning the send function for malicious code.

16. The apparatus of claim 14 further comprising:
    coupled to the declaring module, a module for excising malicious code detected within the send function.

17. The apparatus of claim 14 wherein the non-normal location is within a slack region of a code section within the communications module.

18. The apparatus of claim 14 wherein the non-normal location is within a section of the communications module other than a code section.

19. The apparatus of claim 14 wherein the non-normal location is outside the communications module.

20. A computer-readable storage medium containing computer code for countering malicious code infections that spread from a first computer to a second computer, said computer code comprising instructions for performing the steps of:

searching for communications module within the first computer;

examining a function location directory within the communications module;

locating send function within the function location directory;

declaring the presence of malicious code when the function location directory states that the send function is slated to start executing at a non-normal location; and excising malicious code detected within the send function.

21. The computer-readable medium of claim 20 wherein the non-normal location is within a slack region of a code section within the communications module.

22. The computer-readable medium of claim 20 wherein the non-normal location is within a section of the communications module other than a code section.

23. The computer-readable medium of claim 20 wherein the non-normal location is outside the communications module.

* * * * *